(12) United States Patent
Orue Orue et al.

(10) Patent No.: US 9,181,952 B2
(45) Date of Patent: Nov. 10, 2015

(54) WASHING APPLIANCE AND CONTROL METHOD THEREOF

(71) Applicant: COPRECITEC, S.L., Aretxabaleta (ES)

(72) Inventors: Rodrigo Orue Orue, Elorrio (ES); Javier Rubiales Garrido, Arrasate-Mondragon (ES)

(73) Assignee: COPRECITEC, S.L., Aretxabaleta (ES)

( * ) Notice: Subject to any disclaimer, the term of this patent is extended or adjusted under 35 U.S.C. 154(b) by 457 days.

(21) Appl. No.: 13/720,427

(22) Filed: Dec. 19, 2012

(65) Prior Publication Data

US 2013/0156606 A1 Jun. 20, 2013

(30) Foreign Application Priority Data

Dec. 20, 2011 (EP) ..................................... 11382388

(51) Int. Cl.
*F04B 49/06* (2006.01)
*F04D 15/00* (2006.01)
*A47L 15/00* (2006.01)
(Continued)

(52) U.S. Cl.
CPC ............. *F04D 15/00* (2013.01); *A47L 15/0031* (2013.01); *A47L 15/0049* (2013.01); *D06F 33/02* (2013.01); *D06F 39/085* (2013.01); *F04B 49/06* (2013.01); *A47L 15/4225* (2013.01); *A47L 2401/08* (2013.01); *A47L 2501/05* (2013.01); *D06F 2202/12* (2013.01); *D06F 2204/084* (2013.01); *D06F 2204/10* (2013.01); *F04B 2203/0202* (2013.01); *F04B 2203/0203* (2013.01); *F04B 2203/0204* (2013.01); *Y02B 40/52* (2013.01)

(58) Field of Classification Search
CPC .................. F04B 49/06; F04B 49/065; F04B 2203/0201; F04B 2203/0202; F04B 2203/0204

See application file for complete search history.

(56) References Cited

U.S. PATENT DOCUMENTS

| 6,265,799 B1 | 7/2001 | Uriarte | |
|---|---|---|---|
| 2001/0036093 A1* | 11/2001 | Tanikawa et al. | 363/37 |
| 2003/0175124 A1* | 9/2003 | Hahn et al. | 417/44.1 |
| 2004/0088797 A1 | 5/2004 | Darby | |
| 2008/0047268 A1* | 2/2008 | Isogai et al. | 60/608 |

(Continued)

FOREIGN PATENT DOCUMENTS

| DE | 102007030072 A1 | 1/2009 |
|---|---|---|
| EP | 0287984 B1 | 10/1993 |

(Continued)

OTHER PUBLICATIONS

European Extended International Search Report for EP Application No. 11382388.4 issued by the European Patent Office, dated Jun. 22, 2012, 7 pages, EPO Munich Germany.

*Primary Examiner* — Nathan J Newhouse
*Assistant Examiner* — Christopher Bobish
(74) *Attorney, Agent, or Firm* — Tim L. Kitchen; Peter B. Scull; Hamilton DeSanctis & Cha, LLP

(57) ABSTRACT

Control method for a washing household appliance comprising a drainage pump unit with an impeller and a motor supplied with an alternating supply voltage of a determined frequency from among a plurality of possible preset frequencies. According to one implementation the method involves an adjustment stage in which the frequency of the motor supply voltage is regulated between the preset frequencies. The method also includes an application stage in which a stator voltage is applied to the motor, the frequency of the motor supply voltage being regulated between the preset frequencies in accordance with the stator voltage applied.

11 Claims, 6 Drawing Sheets

(51) Int. Cl.
  *D06F 39/08* (2006.01)
  *D06F 33/02* (2006.01)
  *A47L 15/42* (2006.01)

(56) References Cited

U.S. PATENT DOCUMENTS

2010/0176754 A1  7/2010  Navarra et al.
2010/0275953 A1* 11/2010  Orue Orue et al. ............ 134/18

FOREIGN PATENT DOCUMENTS

| EP | 0644333 | A2 | 3/1995 |
| EP | 0664603 | A1 | 7/1995 |
| EP | 1783264 | A2 | 5/2007 |
| EP | 1942219 | A1 | 7/2008 |
| EP | 2248935 | A1 | 11/2010 |
| EP | 2328266 | A1 | 6/2011 |
| ES | 2162544 | B1 | 12/2001 |

* cited by examiner

WASHING APPLIANCE AND CONTROL METHOD THEREOF

CROSS-REFERENCE TO RELATED APPLICATIONS

The present application relates to and claims priority to European Patent Application No. 11382388.4, filed Dec. 20, 2011.

FIELD

The present invention relates to control methods for household appliances, and more specifically for washing household appliance such as dishwashers and/or washing machines, which comprise a drainage pump unit. The present invention also relates to adapted washing household appliances where said method is implemented.

BACKGROUND

Washing household appliances such as dishwashers and/or washing machines comprise a water circulation pump unit for recirculating water during the washing processes, and a drainage pump unit for removing or draining water from the appliance during a drainage process, which normally rotates at a determined speed of rotation and for a determined period of time.

Drainage pump units comprise an impeller and, generally speaking, a permanent-magnet synchronous motor for rotating the impeller at a determined speed of rotation, by means of which drainage is caused, as disclosed for example in patent documents EP 287984 B1 and ES 2162544 B1. The synchronous motors are connected to the mains supply, which comprises a determined mains frequency, the speed of rotation of the impeller depending on said mains frequency, which is normally substantially constant. The drainage flow depends on the speed of rotation of the impeller, and therefore on the frequency applied to the synchronous motor.

Washing household appliances can also comprise control means for controlling the supply of the drainage pump unit, which enable said units to be switched on at a determined point in time and switched off after a determined time period, when the programme cycle has ended or when deemed convenient. This can be set beforehand in accordance with the washing programme used for example, and the control means have the function of switching on the pump unit to start a drainage process during which the drainage pump unit causes the removal of the water, and of switching off said unit to end said drainage process. Consequently, the drainage processes result in the drainage pump unit being switched on for a preset time period at the predetermined frequency, without taking into account parameters that may optimise or improve the efficiency of said processes or which may even improve the reliability of the drainage pump units. This may cause a premature fault in the drainage pump unit, and due to the tendency of concentrating components in washing appliances, it may become increasingly difficult to replace said unit.

Washing household appliances that overcome this drawback by making the pump unit bigger are known, although this may result in an excessive cost that cannot always be assumed. Some washing household appliances comprise control means to overcome these disadvantages, preventing the need for an increase in size, said control means being adapted to control the supply of the drainage pump unit not only for starting and ending the drainage process, but also for controlling said supply during said drainage process.

Document EP1942219A1 discloses, for example, a washing household appliance of this type. The control means comprised in said appliance can cause the drainage pump unit to switch on and/or off during the drainage process. For this purpose, the household appliance comprises level sensors to detect the water level, and the control means can determine said water level in accordance with the detection of the level sensor. The control means thus cause, during the drainage process, the drainage pump unit to switch on at a determined frequency or said pump unit to switch off in accordance with said determined water level, thereby resulting in a more effective process and also increasing the reliability of the drainage pump unit as it is switched on for a smaller time period in each drainage process.

In some washing household appliances a drainage pump unit with a variable frequency is used, which comprises an impeller and a BLDC-type motor for rotating said impeller. Document EP1783264A2, for example, discloses an appliance that comprises a motor of this type, and also discloses a control method for improving the control of the drainage pump unit. The consumption current of the motor is determined, and said current is associated with a water level. The frequency of the motor supply voltage is modified in order to vary the drainage water flow, in accordance with the related water level. For this purpose the control means also compare the level associated with a preset level.

Document EP 2248935 A1 discloses a washing household appliance that comprises a drainage pump unit with an impeller and a motor supplied with an alternating supply voltage of a determined frequency from among a plurality of possible preset frequencies, and control means adapted to regulate the frequency of the motor supply voltage between the preset frequencies.

SUMMARY

According to one implementation a control method is provided that can be used in washing household appliances comprising a drainage pump unit with an impeller and a motor supplied with an alternating supply voltage of a determined frequency from among a plurality of possible preset frequencies. The method comprises an adjustment stage in which the frequency of the motor supply voltage is regulated between the preset frequencies and an application stage in which a stator voltage is applied to the motor, the frequency of the motor supply voltage being regulated between the preset frequencies in accordance with the stator voltage applied.

As a result, the pump unit can be used in a more optimum and reliable way as said unit can be made to provide a correct drainage process with a frequency that results in an optimum current consumption (the minimum necessary permitted by the system conditions of the household appliance in guaranteeing its proper functioning). The pump unit can thus operate in a more comfortable manner, as far as possible from the current limit values. In addition, as the stator voltage is used as the reference value for regulating the frequency of the motor supply voltage between the preset frequencies, the risk of the regulation of the frequency not being the most optimum due to the fact that different motors may have different construction characteristics due to their mass production, for example, is eliminated or reduced, as the characteristic of the stator voltage presents less dispersion between different motors manufactured in this way.

These and other advantages and characteristics will be made evident in the light of the drawings and the detailed description thereof.

DETAILED DESCRIPTION

Figure 1:
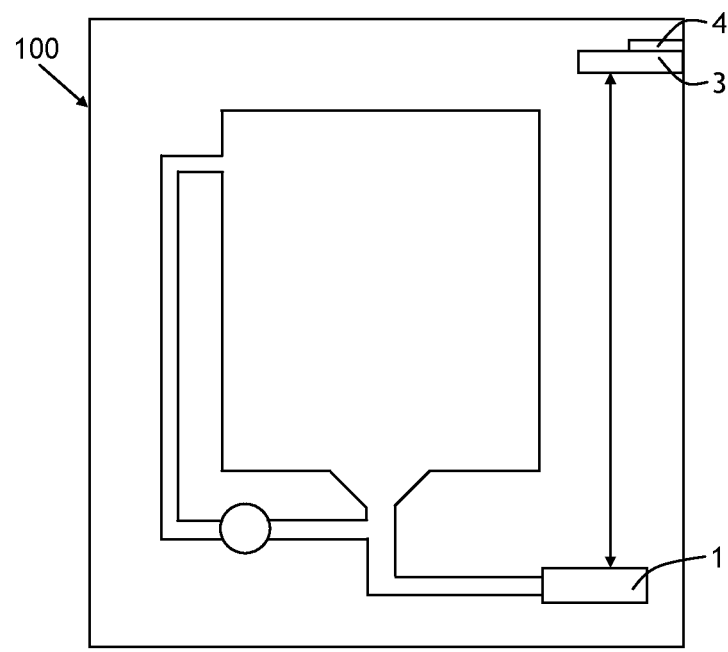
FIG. 1 schematically shows a washing household appliance according to one implementation.

According to one implementation a control method is provided for washing household appliances, such as dishwashers or washing machines for example, of the type that comprise a drainage pump unit 1 for removing or draining water from its interior, which also comprises an impeller and a motor for rotating the impeller at a speed of rotation Vg to cause the drainage. FIG. 1 schematically shows, by way of example, an embodiment of one of these appliances 100, which in this case corresponds to a dishwasher.

The motor is supplied by a variable alternating supply voltage with a determined frequency F, and as a result causes the rotation of the impeller at a determined speed of rotation Vg in accordance with the number of poles of the rotor of the motor, according to the following equation:

$$Vg = F * \frac{60}{P}$$

Where:
Vg=the rotation speed of the impeller,
F=the frequency of the motor supply voltage, and
P=the number of pairs of poles of the rotor.

The rotation speed Vg depends on the frequency F of the motor supply voltage, and by means of regulating the frequency F the rotation speed Vg is regulated, it thereby being possible to regulate the operating conditions of the pump unit 1 in the system in which it is disposed, and reduce, for example, the current consumption of the motor in accordance with the requirements.

The pump unit 1 of the appliance 100 can perform different drainage processes. One may be for example, a specific process that occurs in the centrifuge cycle of a washing machine, during which the flow Q of water that is drained is reduced as said specific drainage process progresses due to a reduction of the water present in the appliance and not to the rotation speed of the impeller. In another drainage process, known as a full-flow drainage process Pc, the flow Q of water that is drained remains substantially constant unless the rotation speed of the impeller is changed as a result of a change in the frequency F of the motor supply voltage. In another drainage process, known as an air-water drainage process Pag and which occurs after the full-flow drainage process Pc, the frequency F of the motor supply voltage is generally reduced to a minimum frequency that is predetermined beforehand, as the amount of water to be drained is considerably reduced.

For the full-flow drainage process Pc, the manufacturer defines or presets a plurality of possible frequencies F for the motor supply voltage, limited by a maximum possible frequency Fmax and a minimum frequency Fmin. The maximum and minimum frequencies Fmax and Fmin are selected in accordance with hydraulic and mechanical factors so as not to force the pump unit 1 when it is operating. The preset frequencies F therefore fall within a range delimited between the maximum and minimum frequencies Fmax and Fmin, said maximum and minimum frequencies Fmax and Fmin being included between said preset frequencies F. By way of example, the maximum and minimum frequencies Fmax and Fmin may be 60 Hz and 30 Hz respectively, and five intermediate frequencies F of 35, 40, 45, 50 and 55 Hz may be set. This example is not restrictive, other frequency F values being capable of being selected, and a different number of intermediate frequencies F.

Figure 2:
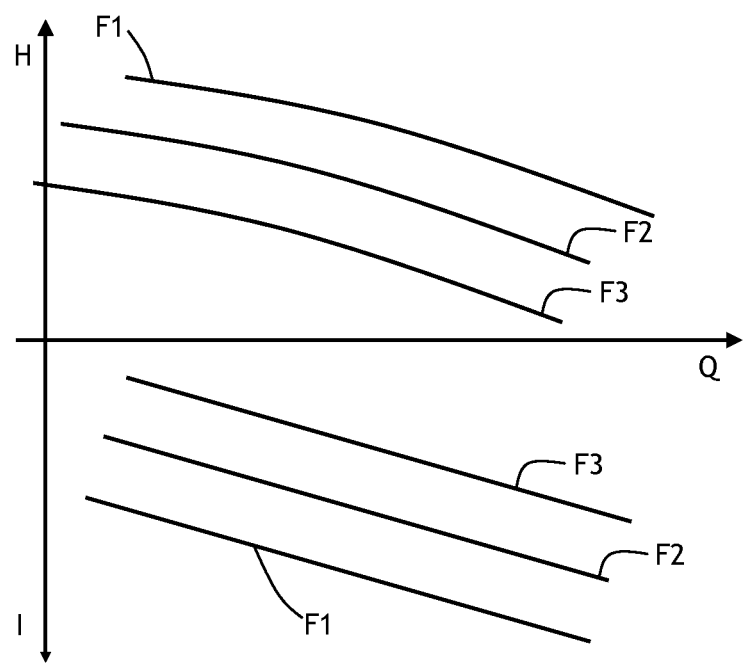
FIG. 2 shows representative characteristic curves of a pump unit of the appliance of FIG. 1.

In one implementation the motor is a PMSM-type motor and the current that said motor consumes can be determined, and even monitored, by means of a control device suitable for such a purpose that is known and used in this type of motor and which enables the current of the motor to be associated with the frequency F of the motor supply voltage. For a determined frequency F the current in the motor produces a torque that causes the rotation of the impeller, thereby providing a determined drainage flow Q, and the suitable control device adapts the current consumption of the motor to provide a continual flow with the minimum possible current consumption. The manufacturer can thus preset or define a pump unit 1 for the appliance 100, the characteristics of which are represented by way of example in FIG. 2. FIG. 2 shows the characteristics of the pump unit 1 that associate the current consumption of the motor with its supply frequency F (frequencies F1, F2 and F3, by way of example in this case) and the characteristics of the system (delivery head H and flow Q).

Figure 3:
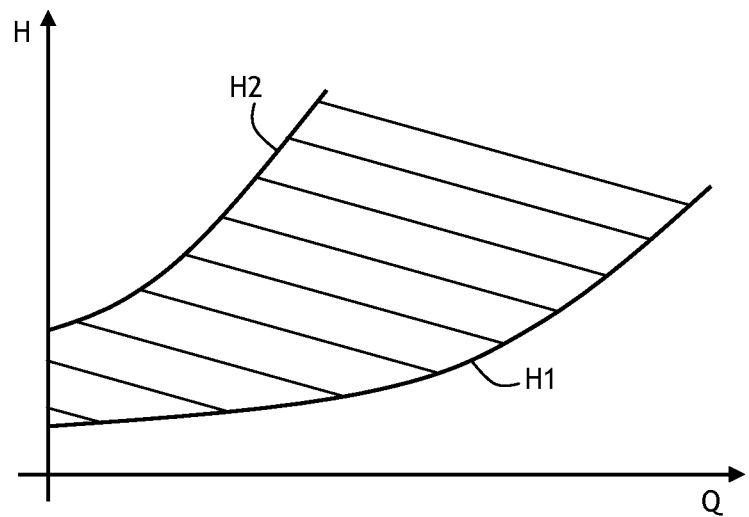
FIG. 3 shows a representative work area for the drainage pump unit of the appliance of FIG. 1.

The manufacturer also presets or defines limit parameters for the system of the appliance 100, within which the pump unit 1 must operate or work. FIG. 3 shows, by way of example, said limits in the form of system curves H1 and H2, which represent, for a given appliance 100 and taking into account the various system options (type of hose for drainage, the diameter and length of said hose), the minimum and maximum height respectively at which a drainage point may be disposed for said system. These system curves H1 and H2 detail the drainage flow Q of the pump unit 1 (abscissa axis) with the manometric height H (pressure, ordinate axis) that said pump unit 1 generates in the corresponding system, the pump unit being adapted to operate between both curves H1 and H2.

Figure 4:
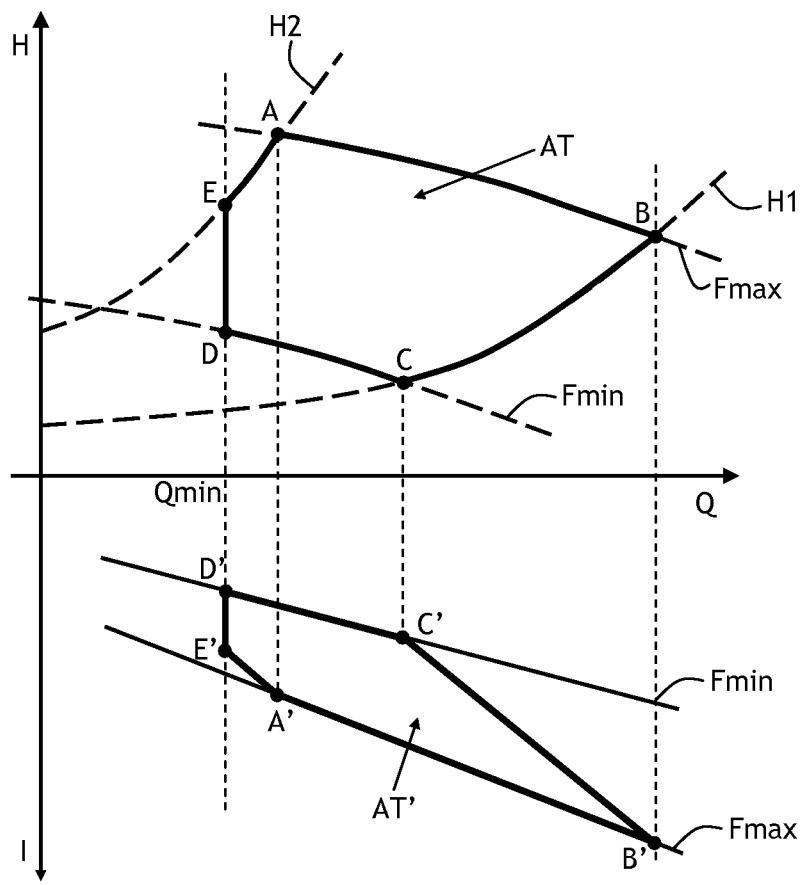
FIG. 4 shows a representative work area of the pump unit of the appliance of FIG. 1.

To provide a correct full-flow drainage process Pc, the manufacturer also presets or defines a minimum flow Qmin that must be guaranteed for any possible system of the appliance 100. FIG. 4 shows an example of a work area AT of the pump unit 1 for the full-flow drainage process Pc, which is delimited by the system curves H1 and H2, by the maximum and minimum frequencies Fmax and Fmin permitted for the motor supply voltage, and by said minimum flow Qmin (which is represented by a straight line in said FIG. 4). When the pump unit 1 is operating in the work area AT it is fulfilling the necessary requirements for providing a correct full-flow drainage process Pc: it guarantees the minimum flow Qmin operating within the preset frequency limits Fmax and Fmin. In the graph showing the manometric height H with the flow Q, the work area AT is delimited by the points A, B, C, D and E, whereas in the graph that links said flow Q to the current of the motor, the work area AT' is delimited by the points A', B', C', D' and E', which correspond respectively with the points A, B, C, D and E of the graph that links the delivery head H with the flow Q.

According to one implementation the pump unit 1 is adapted to the system of the appliance 100, so that, during the full-flow drainage process Pc, for example, it operates comfortably. To operate more comfortably during the full-flow drainage process Pc means that it operates at frequencies F and/or currents I far from the Imax and Fmax limits that guarantee a minimum flow Qmin.

The objective of operating more comfortably in the full-flow drainage process Pc is achieved by causing the pump unit 1 to operate on the line C', D', E' shown in the example of FIG. 4, which corresponds with the situation in which the drainage flow Q is substantially equal to the required minimum flow Qmin (the line D'-E') or with the situation in which the frequency F of the motor supply voltage is equal to the minimum frequency Fmin permitted (the line C'-D'). That operating point has a determined current consumption corresponding to it, and this value of the current is known as the optimum value of the current, so that each frequency F has a determined optimum current value corresponding to it. As a result, the optimum current value corresponds with the minimum possible current value of the motor to guarantee the function required of the pump unit 1 in the full-flow drainage process Pc, so that said pump unit 1 operates in a more comfortable manner and with a frequency F of the motor supply voltage that is as low as possible, said optimum current value being the current value objective or reference for the consumption of the motor.

Figure 5:
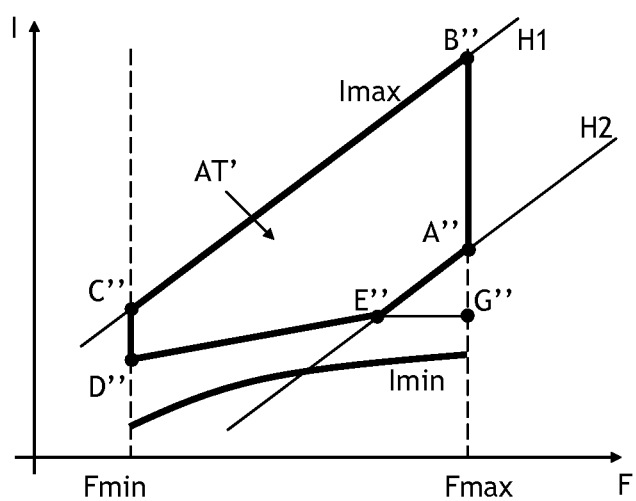
FIG. 5 shows the work area of FIG. 4, in a graph that shows the current and the frequency of the motor of the pump unit of the appliance of FIG. 1.

FIG. 5 shows the work area AT' of FIG. 4 converted into a relationship between the current of the motor and the frequency F of the supply voltage of said motor, the limit fixed by the minimum current for the full-flow drainage process Pc (air-water limit) also being shown. The air-water limit shown is not restrictive, and can comprise forms other than the curved line shown in FIG. 5. The points A", B", C", D" and E" correspond with the points A', B', C', D' and E' of FIG. 3 respectively, and the optimum value of the current corresponds with the D"-E"-G" line (the E"-G" line is outside the range delimited between the system curves H1 and H2).

If optimum current values are preset for different situations, different flows and/or different frequencies F, it has been found that said optimum values do not operate equally in all the appliances 100. It has also been found that this can be due to the fact that different motors may behave differently, especially when manufactured in mass-production lines, due to a dispersion of tolerances in the construction characteristics of the motor. Although the dispersions are not very large, they may result in the pump unit 1 of an appliance 100 not operating in the most comfortable manner possible permitted by the system in the full-flow drainage process Pc, as the optimum current values obtained for a motor may not correspond with the optimum current values for another motor.

Figure 6:
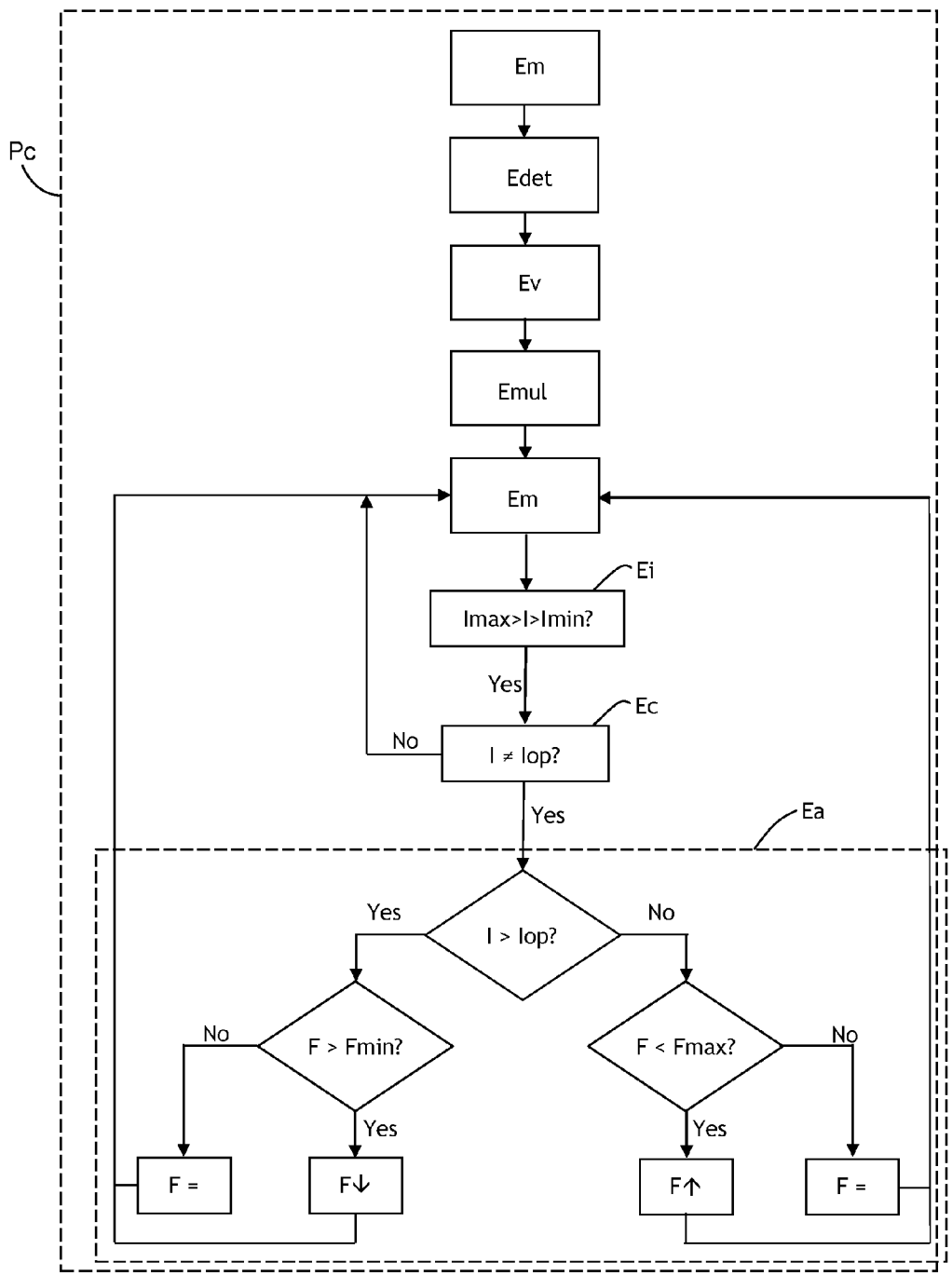
FIG. 6 shows a block diagram representing methods for controlling the motor of a drain pump of a household washing appliance according to some implementations.

As shown by way of example in FIG. 6, the control method of the invention comprises an adjustment stage Ea in which the frequency F of the motor supply voltage is regulated between the preset frequencies F beforehand, for a full-flow drainage process Pc, and an application stage Em in which a stator voltage Vs is generated and applied to the motor, the frequency F of the motor supply voltage being regulated between the preset frequencies F in accordance with the stator voltage Vs generated and applied. The dispersion in the stator voltages Vs of different motors is smaller than the dispersion of other characteristics, such as the dispersion of current, as a result of which, by taking into account the stator voltage Vs for regulating the frequency F the appliance 100 may be made to operate more efficiently than if another characteristic were used.

In the method a determined characteristic of the motor between its stator voltage Vs and its current is also selected, and in a determination stage Ei it is determined if the stator voltage Vs generated and applied in the application stage Em has a value of the determined characteristic of the motor that is within a range of values delimited by the determined minimum value and a maximum value preset for said determined characteristic and for each frequency F corresponding to it. The method also comprises a comparison stage Ec in which, if the value of the determined characteristic is within the range of preset values, said value is compared with corresponding optimum values preset for said determined characteristic, each optimum value corresponding with the value of said characteristic, which enables the pump unit 1 to operate in a comfortable manner in a full-flow drainage process Pc and an optimum value corresponding to each present frequency F. In the adjustment stage Ea, therefore, the frequency F of the motor supply voltage is regulated taking into account the result of said comparison, with the aim of the value of said characteristic of the motor being substantially equal or as close as possible to its optimum value.

In general, in the adjustment stage Ea:
a reduction of the frequency F of the supply voltage is caused if in the comparison stage Ec it is determined that the value of the determined characteristic is greater than its optimum value and if the frequency F of said supply voltage is greater than the minimum frequency Fmin;
the frequency F of the motor supply voltage is maintained if in the comparison stage Ec it is determined that the value of the determined characteristic is greater than its optimum value and the frequency F is equal to the minimum frequency Fmin;
an increase of the frequency F of the supply voltage is caused if in the comparison stage Ec it is determined that the value of the determined characteristic is smaller than its optimum value and if the frequency F of said supply voltage is smaller than the maximum frequency Fmax; and
the frequency F of the motor supply voltage is maintained if in the comparison stage Ec it is determined that the value of the determined characteristic is smaller than its optimum value and the frequency F is equal to the maximum frequency Fmax.

Preferably, in the method a field oriented control or FOC is used to apply the stator voltage Vs in the application stage Em and to determine the stator voltage Vs of the motor in the determination stage Ei, a first component Vsd and a second component Vsq of the stator voltage Vs perpendicular to the first component Vsd of the stator voltage Vs being obtained. In the field oriented control a reference of component Id equal to zero is also applied, the current I of the motor being equal to the current component Iq. The field oriented control is known through an expert in the field and is not detailed herein as it is not an object of the invention.

In a first embodiment of the method of the invention the determined characteristic of the motor selected corresponds with the current of the motor, so that the stored optimum values correspond with the optimum values Io of the current of the motor for the different preset frequencies F. In the first embodiment preset current values I are also stored, each of them associated with a determined stator voltage Vs, and these values are determined at the factory, for example, by selecting values measured in a motor or average values for readings taken from different motors for example In the first embodiment, when the appliance 100 is switched on and the stator voltage Vs generated in the application stage Em, the components Vsd and Vsq of said stator voltage Vs determine the value of the component I of the current in accordance with the component Vsd generated, and said determined value is compared with the value associated with the stator voltage Vs generated. If they are different a multiplication factor is determined, the aim of which being to equal the value of the determined component I with the stored one, and said multiplication factor is applied to all the preset optimum values Io. As a result a possible dispersion in the construction characteristics of the motor is compensated for, and a more efficient appliance 100 can be obtained. Evidently, if the determined value is equal to the preset value there is no need to apply a multiplication factor to the corresponding optimum values, which remain the same as when they were preset.

In the first embodiment, in the determination stage Ei it is determined if the determined value of the component I of the current of the motor is within a range of values delimited by the determined minimum value and the maximum value preset for said component I, for the corresponding frequency F. If the value of said component I of the current of the motor is within said range, in the comparison stage Ec said value is compared with the corresponding optimum value Io (which corresponds with the preset value or with the new value once the multiplication factor has been applied if appropriate), and in the adjustment stage Ea the frequency F of the motor supply voltage is regulated taking into account the result of said comparison, with the aim of the value of said characteristic of the motor being substantially equal or close to its optimum value Io.

Figure 7:
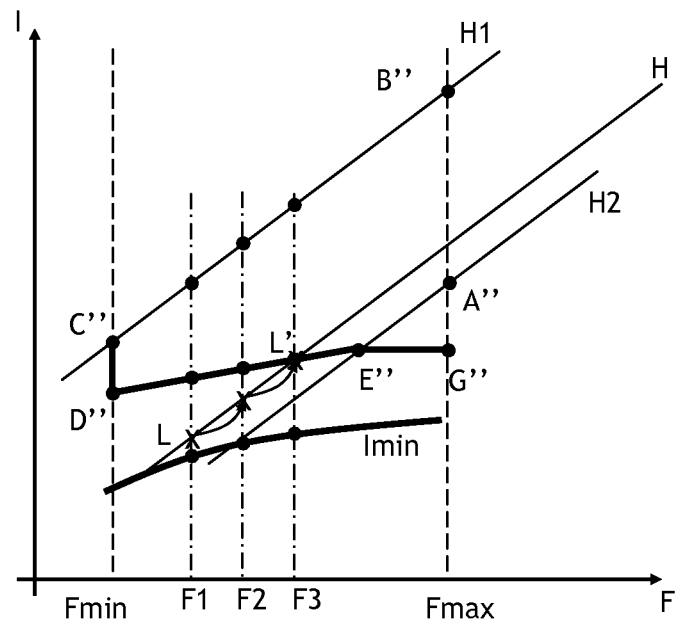
FIG. 7 illustrates a method of operating a motor of a drain pump according to one implementation.
Figure 8:
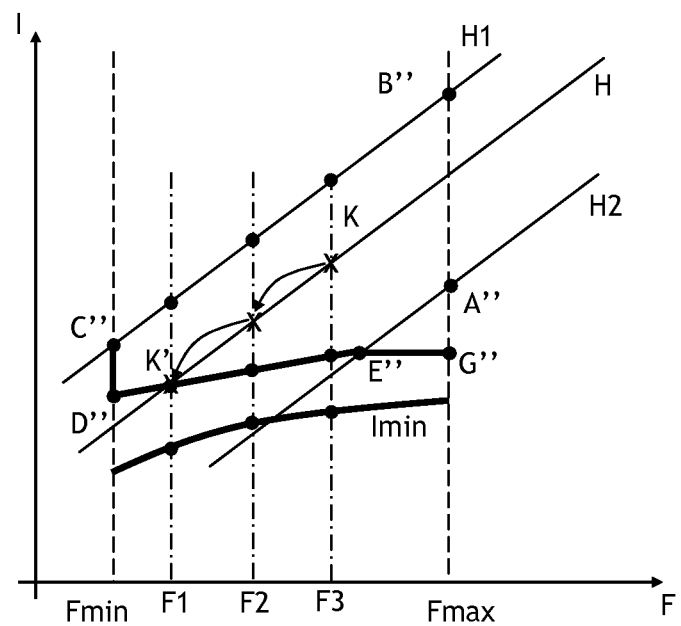
FIG. 8 illustrates a method of operating a motor of a drain pump according to one implementation.
Figure 9:
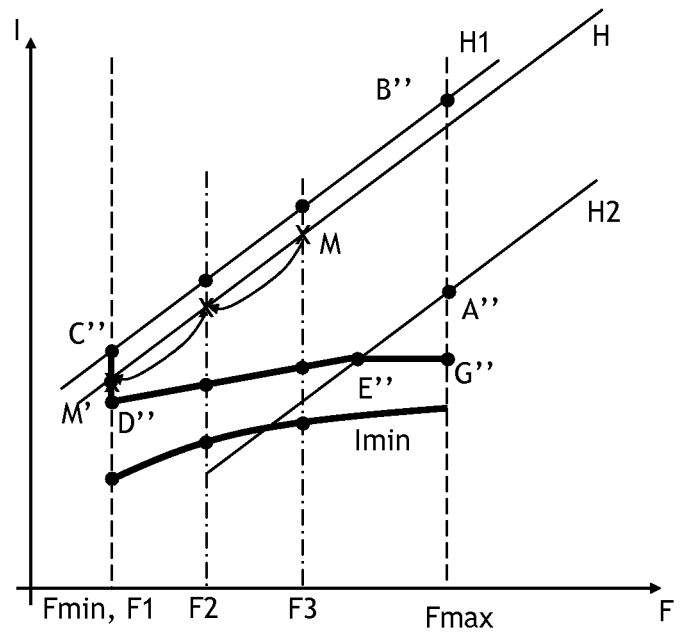
FIG. 9 illustrates a method of operating a motor of a drain pump according to one implementation.

FIGS. 7 to 9 show three examples of the operating of the method in the first embodiment, during a full-flow drainage process Pc, for a given curve of system H, by way of example, in each case. The three FIGS. 7 to 9 show a plurality of frequencies F1, F2 and F3 preset for the motor supply voltage, the work area AT' and a line corresponding to the minimum current permitted in said motor for said full-flow drainage process Pc. For each frequency F1, F2 and F3 the three stored values are shown by means of a circle: a maximum value Imax for the component I of the current of the motor (corresponding with the curve H1), a minimum value Imin for the component I of the current of the motor (with the curve Imin) and an optimum value Ido of the component I of the current of the motor (with the line D"-E"-G").

In the first example, shown in FIG. 7, the motor is supplied with a supply voltage with a preset frequency F1. It is determined that the value of the component I of the current of the motor at that frequency F1 (point L) is smaller than the corresponding optimum value Io (a point on the line D"-E" in this case), and in the adjustment stage Ea the frequency F of the supply voltage is increased to a frequency F2. At said frequency F2 it is determined that the new value of the component I of the current (represented by an X) is still smaller than the corresponding optimum value Io for said frequency F2 (a point on the line D"-E" in this case), and the frequency F is increased to a frequency F3. At said frequency F3 it is determined that the new value of the component I of the current (point L') is substantially equal to the corresponding optimum value Io for said frequency F3, and the frequency F3 of the supply voltage is maintained until the full-flow drainage function Pc is completed. When the frequency F3 is set, cyclical checks can continue to be made to determine if the value of component I of the current remains substantially equal to the corresponding optimum value Io, which occurs for as long as the full-flow drainage process Pc lasts. When the water runs out and the value of the component I of the current is smaller than the corresponding value for the air-water limit, the relevant action is taken.

In the second example, shown in FIG. 8, the motor is supplied with a supply voltage with a preset frequency F3. It is determined that the determined value of the component I of the current of the motor at that frequency F3 (point K) is greater than the optimum value Io preset for said frequency F3 (a point on the line D"-E" in this case), and the frequency of the supply voltage is reduced to a frequency F2. At said frequency F2 it is determined that the determined value of the component I of the current (represented by an X) is still greater than the optimum value Io preset for said frequency F2 (a point on the line D"-E" in this case), and the frequency F of the supply voltage is reduced to a frequency F1. At said frequency F1 it is determined that the determined value of the component I of the current (point K') is substantially equal to the optimum value Io preset for said frequency F1, and the frequency F1 of the supply voltage is maintained, until the full-flow drainage process Pc is completed. When the frequency F1 is set, cyclical checks can continue to be made to determine if the value of component I of the current remains substantially equal to the corresponding optimum value Io, which occurs for as long as the full-flow drainage process Pc lasts. When the water runs out and the value of the component I of the current is smaller than the corresponding value for the air-water limit, the relevant action is taken.

In the third example, shown in FIG. 9, the motor is supplied with a supply voltage with a preset frequency F3. It is determined that the determined value of the component I of the current of the motor at that frequency F3 (point M) is greater than the optimum value Io preset for said frequency F3 (a point on the line D"-E" in this case), and the frequency of the supply voltage is reduced to a frequency F2. At said frequency F2 it is determined that the value of the component I of the current (represented by an X) is still greater than the optimum value Io preset for said frequency F2, and the frequency F of the supply voltage is reduced to a frequency F1. As the frequency F1 corresponds with the minimum frequency Fmin, it is determined that the frequency F can no longer continue to be reduced and the operating point is maintained at M' with a determined value of the current greater than the preset optimum value Io corresponding to the minimum frequency Fmin, until the full-flow drainage process Pc is completed. When the water runs out and the value of the component I of the current is smaller than the corresponding value for the air-water limit, the relevant action is taken.

Figure 10:
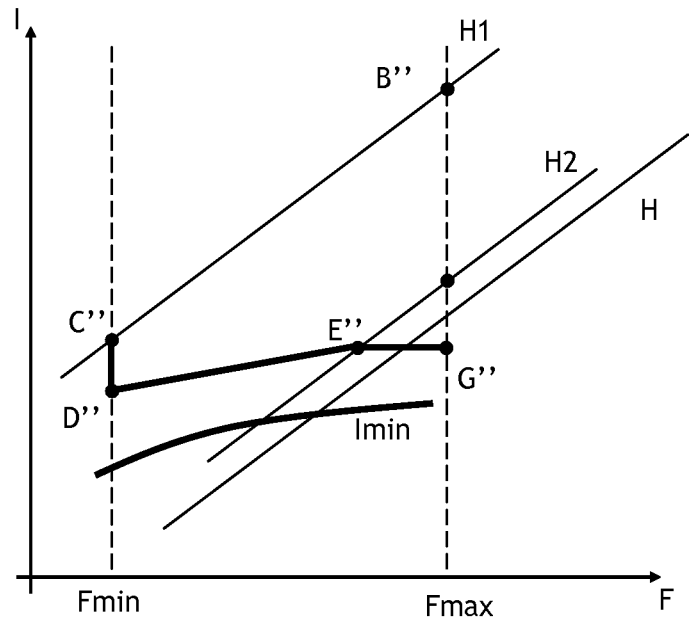
FIG. 10 shows an example in which there is a system outside the work area shown in FIG. 4.

In some cases the pump unit 1 can be allowed to operate in a range outside the limits set by the system curves H1 and H2, cases in which the appliance 100 will operate as if it were inside said ranges (example of FIG. 10). In this case, the optimum value Io preset for the component I of the current of the motor corresponds with the line D"-E"-G".

In a second embodiment the determined characteristic of the selected motor corresponds with the stator voltage Vs of the motor, so that the stored optimum values correspond with the optimum values of the stator voltage Vs of the motor for the different preset frequencies F.

In the second embodiment, as the appliance 100 is switched on and the stator voltage Vs generated in the application stage Em, the components Vsd and Vsq of said stator voltage Vs, the component of the stator voltage Vs that is taken into account is the second component Vsq, which has been shown to comprise a very small dispersion in comparison to the first component Vsd for example, so that the variations in the value of said second component Vsq from one motor to another is very small. The stored optimum values thus correspond with the optimum values of the second component Vsq of the stator voltage Vs, and in this case no multiplication factor is required, as it is required in the first embodiment.

For drainage processes other than the full-flow drainage process Pc, such as the air-water drainage process Pag, a minimum current consumption is set for each frequency F that corresponds with an air-water limit. In a modification stage not shown in the figures, the value of the current I is compared with the minimum value of the corresponding current for the present frequency F and, if said current value is equal to or smaller than said minimum current value it is determined that the full-flow drainage process Pc has ended and that the air-water drainage process has started. Said modification stage may take place during the full-flow drainage process Pc.

As commented above, in the air-water drainage process the frequency F of the motor supply voltage generally decreases to a minimum frequency that is predetermined beforehand, as the quantity of water to be drained has decreased considerably. This may involve, in some cases, an unpleasant noise for the user of the appliance 100, as the frequency used in said air-water drainage process comprises the same value predetermined at the factory. The method of the invention can also comprise, once the full-flow drainage process Pc has ended, an assignment stage in which a determined frequency that depends on the system is assigned, to be applied to the motor in the air-water drainage process instead of a frequency predetermined at the factory being assigned. The selection of the determined frequency to be assigned depends on the operating frequency F determined in the full-flow drainage process Pc, so that the pump unit 1 can operate in the most comfortable manner possible during said full-flow drainage process Pc, as said set operating frequency F is the result both of the system of the appliance 100 and of the characteristics of the motor. Thus, previously (at the factory for example), each possible frequency F is associated to a determined frequency to be assigned, so that when it is determined that the full-flow drainage process Pc has ended and the air-water drainage process has started, the determined frequency associated with the operating frequency F determined in the full-flow drainage process Pc is assigned to the frequency of the motor supply voltage, the motor being supplied with the determined frequency assigned in the assignment stage during the air-water drainage process.

As commented above the frequency F that is determined in the full-flow drainage process Pc is the one that is used to later obtain the determined frequency to be assigned, and in the invention said frequency F is determined in accordance with the stator voltage Vs applied, although evidently the manner of obtaining the frequency F is not restrictive in terms of the linking of the determined frequency and the assignment stage, which can also be carried out if the frequency F is determined in accordance with the current I as is the case in EP 2248935 A1, or even in another manner in which the system is taken into account.

The invention also relates to an appliance 100 where the aforementioned method is implemented, in any of its embodiments. The appliance 100 comprises control means 3 adapted to carry out the various stages of the method, and can comprise for example a microprocessor, a controller, an FPGA or an equivalent device. The appliance 100 also comprises storage means 4 where the values required to carry out the method are stored, such as the optimum values of the characteristic selected, the limits for said characteristic, the preset frequencies F, the frequency limits, and the determined frequencies Fs associated with the preset frequencies F, for example. The storage means 4 comprise at least one memory, of any known type, which may or may not be built into the control means 3.

What is claimed is:

1. An appliance comprising
a drain pump capable of operating in a full-flow drainage mode, the drain pump having an impeller and a motor configured to be supplied with an alternating supply voltage that drives the impeller, the motor comprising a stator,
a controller adapted to apply a stator voltage to the motor according to the frequency of the alternating supply voltage and to control the frequency of the alternating supply voltage among a plurality of predetermined frequencies when the drain pump is operated in the full drainage mode,
a storage medium associated with the controller that stores for each predetermined frequency a maximum component q value of the stator voltage, a minimum component q value of the stator voltage and a pre-set optimal component q value of the stator voltage; and
the controller storing computer implemented instructions that when executed (a) determines an initial component q value of the stator voltage when an alternating supply voltage is first supplied to motor when the drain pump is operated in the full-flow drainage mode, the alternating supply voltage corresponding to one of the plurality of predetermined frequencies, (b) compares the initial component q value of the stator voltage with the corresponding pre-set optimal component q value of the stator voltage for the predetermined frequency, (c) monitors the component q value of the stator voltage applied to the motor to determine if the monitored component q value of the stator voltage is between the maximum component q value of the stator voltage and the minimum component q value of the stator voltage, (d) upon determining that the monitored component q value of the stator voltage is between the maximum component q value of the stator voltage and the minimum component q value of the stator voltage, compares the monitored component q value of the stator voltage with the optimal component q value of the stator voltage, and (e) adjusts the frequency of the alternating supply voltage among the plurality of predetermined frequencies to cause the monitored component q value of the stator voltage to more closely match the optimal component q value of the stator voltage.

2. An appliance according to claim 1, wherein in the full-flow drainage mode the motor is designed to operate at a minimum alternating supply voltage frequency and wherein the controller stores executable instructions that when executed cause a reduction in the frequency of the alternating supply voltage among the plurality of predetermined frequencies when the monitored component q value of the stator voltage is detected by the controller to be greater than the optimal component q value of the stator voltage and when the frequency of the alternating supply voltage is greater than the minimum alternating supply voltage frequency.

3. An appliance according to claim 1, wherein in the full-flow drainage mode the motor is designed to operate at a minimum alternating supply voltage frequency and wherein the controller stores executable instructions that when executed causes the frequency of the motor alternating supply voltage to remain at one of the predetermined frequencies when the monitored component q value of the stator voltage is detected by the controller to be greater than the optimal component q value of the stator voltage and the predetermined frequency is equal to the minimum alternating supply voltage frequency.

4. An appliance according to claim 1, wherein in the full-flow drainage mode the motor is designed to operate at a maximum alternating supply voltage frequency, the controller storing executable instructions that when executed causes an increase in the frequency among the plurality of predetermined frequencies when the component q value of the stator voltage is detected by the controller to be less than the optimal component q value of the stator voltage and when the frequency of the alternating supply voltage is less than the maximum alternating supply voltage frequency.

5. An appliance according to claim 1, wherein in the full-flow drainage mode the motor is designed to operate at a maximum alternating supply voltage frequency, the controller storing executable instructions that when executed causes the frequency of the motor alternating supply voltage to remain at a predetermined frequency when the monitored component q value of the stator voltage detected by the controller to be less than the optimal component q value of the stator voltage and the predetermined frequency is equal to the maximum alternating supply voltage frequency.

6. An appliance according to claim 1, wherein the appliance is a dishwasher or a washing machine.

7. A method of controlling a motor of a drain pump of an appliance, the motor configured to operate at a plurality of predetermined frequencies between minimum and maximum alternating supply voltage frequencies, the motor configured to operate at each predetermined frequency at a corresponding pre-set optimal component q value of the stator voltage, the method comprising:
   determining an initial component q value of the stator voltage when an alternating supply voltage is first supplied to the motor when the drain pump is operated in a full-flow drainage mode, the alternating supply voltage corresponding to one of the plurality of predetermined frequencies,
   comparing the initial component q value of the stator voltage with the corresponding pre-set optimal component q value of the stator voltage for the predetermined frequency,
   monitoring the component q value of the stator voltage applied to the motor to determine if the monitored component q value of the stator voltage is between a maximum component q value of the stator voltage and a minimum component q value of the stator voltage,
   upon determining that the monitored component q value of the stator voltage is between the maximum component q value of the stator voltage and the minimum component q value of the stator voltage comparing the monitored component q value of the stator voltage with the optimal component q value of the stator voltage, and
   adjusting the frequency of the alternating supply voltage among the plurality of predetermined frequencies to cause the monitored component q value of the stator voltage to more closely match the optimal component q value of the stator voltage.

8. A method according to claim 7, further comprising reducing the frequency of the alternating supply voltage among the plurality of predetermined frequencies when the monitored component q value of the stator voltage is greater than the optimal component q value of the stator voltage and when the frequency of the alternating supply voltage is greater than the minimum alternating supply voltage frequency.

9. A method according to claim 7, further comprising maintaining the frequency of the motor alternating supply voltage at a predetermined frequency when the monitored component q value of the stator voltage is greater than the optimal component q value of the stator voltage and the predetermined frequency is equal to the minimum alternating supply voltage frequency.

10. A method according to claim 7, further comprising increasing the frequency of the alternating supply voltage among the plurality of predetermined frequencies when the monitored component q value of the stator voltage is less than the optimal component q value of the stator voltage value and when the frequency of the alternating supply voltage is less than the maximum alternating supply voltage frequency.

11. A method according to claim 7, further comprising maintaining the frequency of the alternating supply voltage at a predetermined frequency when the monitored component q value of the stator voltage is less than the optimal component q value of the stator voltage and the predetermined frequency is equal to the maximum alternating supply voltage frequency.

* * * * *